March 10, 1959 — A. ARGENIO — 2,876,578
AUTOMATIC FISHING DEVICE
Filed July 11, 1957
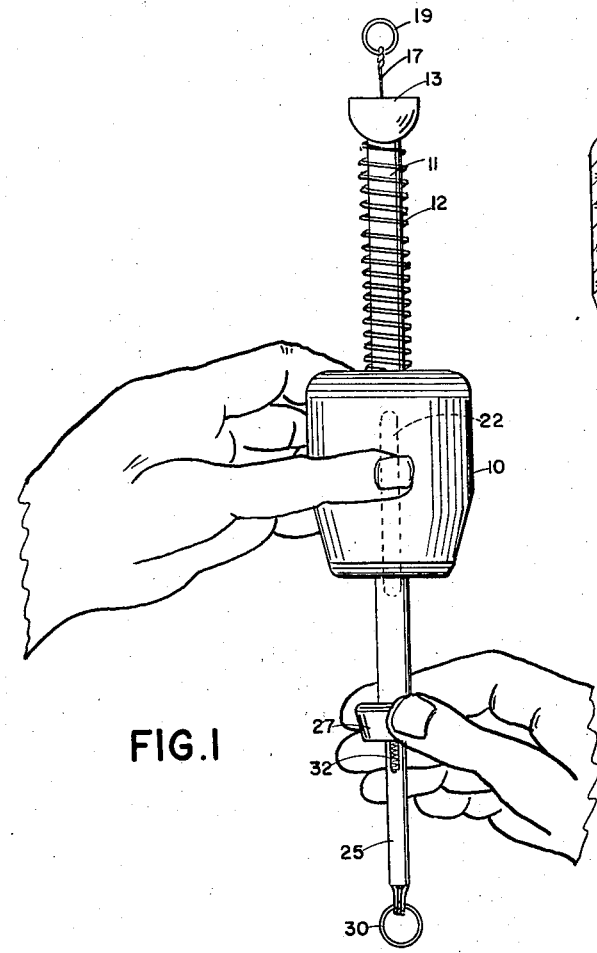
FIG. 1
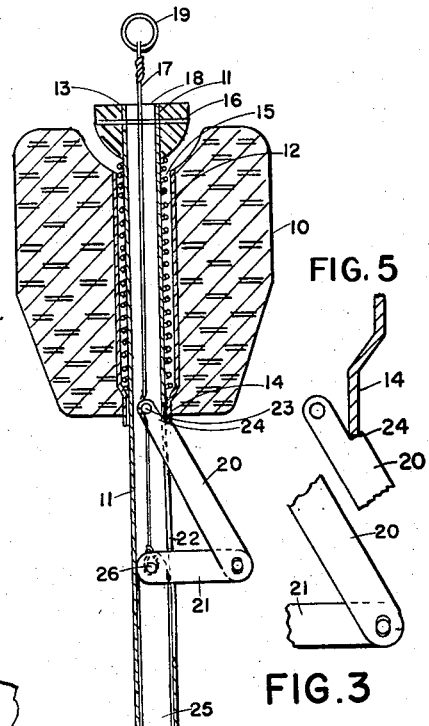
FIG. 5
FIG. 3
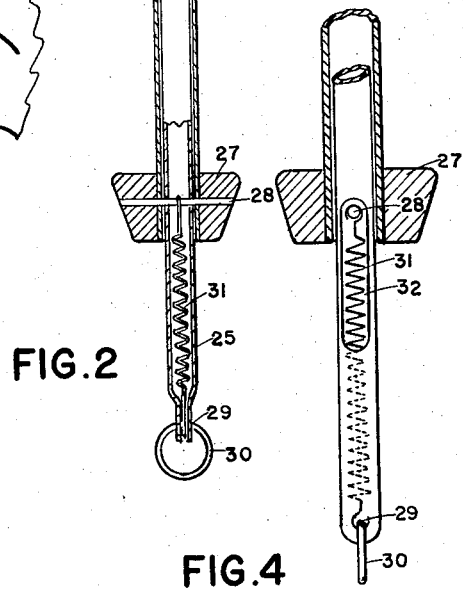
FIG. 2
FIG. 4
INVENTOR.
Anthony Argenio.
BY
ATTORNEY.

United States Patent Office 2,876,578
Patented Mar. 10, 1959

2,876,578

AUTOMATIC FISHING DEVICE

Anthony Argenio, Arcadia, Calif.

Application July 11, 1957, Serial No. 671,231

2 Claims. (Cl. 43—15)

This invention relates to new and useful improvements in fishing paraphernalia, and it has for its object to provide an automatic fishing device that will obviate the necessity of a fisherman, especially those who for pleasure or as a sport go fishing, from watching his line through tedious hours in order to find out if a fish has been caught on the line.

The device as set forth herein will infallibly grip or hold the fish; and the device may in this connection be provided with a bell (not shown), whereby the concern of the fisherman about the usual trivialities incidental to fishing are entirely removed, thus making fishing an easy and leisurely sport.

With the above and other objects in view, this invention consists of the novel features of construction, combination and arrangement of parts, hereinafter fully described, claimed and illustrated in the accompanying drawing, forming part of this specification, and in which similar characters of reference indicate corresponding parts, and in which:

Figure 1 is an elevational view showing my device in an inactive position.

Figure 2 is a transverse sectional view showing my device in operation, that is in "cocked" or triggered position.

Figure 3 is a detail view, while

Figure 4 is a sectional side view of the lower part of the device shown in Figure 2.

Figure 5 is a fragmentary view showing the lever mechanism in an inoperative position.

Referring more particularly to the drawing, the numeral 10 indicates a float of any suitable material, such for instance as cork; a longitudinal tube 11 is movably inserted through a central opening 15 in said float, said tube has at its upper end a spring 12 mounted thereon, this spring abuts at its top against a knob 13 which is secured to the tube 11 by a pin 16, and at its bottom against a set off 14 formed inside the opening 15 in said float.

A thin wire 17 is arranged within the tube 11 and passes through an opening 18 in the knob 13, said wire terminates at its top in a loop 19 to which the line (not shown) from a fishing pole may be attached.

A knee-bent lever system comprising two members 20 and 21, pivotally secured together, are arranged at about the center of the device, said members will when the device is "cocked" assume an acute angle, as shown in Figure 2.

The tube 11 is formed with a longitudinal slot 22 in one side thereof, as shown in dotted lines in Figure 1. The said slot is adapted to accommodate the lever members 20 and 21, when the device is in "cocked" position, as shown in Figure 2; while the said levers will retract within the opening 15 in the float and extend one in elongation of the other, when the mechanism is set off, due to the contraction of the springs, or when the device is in an inoperative position.

The lever member 20 is pivotally secured to the tube 11 by a pin 23, and is formed with a reduced portion 24 to permit the retraction of said member within the float during release of the mechanism.

The lever member 21 is pivotally secured to another downwardly extending tube or member 25 by a hinge pin 26 to which the wire 17 is also attached. A knob 27 is fixedly secured at the lower end of the tube 11. A pin 28 extends through said knob 27 and member 25, while one end of a spring 31 is attached to said pin 28.

The said member 25 terminates at the bottom in two eyelets 29 through which a ring 30 is mounted and to which also the other end of the spring 31 is secured.

The member 25 is formed with an oblong slot 32 therein to permit the movement of the pin 28 therein in contracting or releasing the device.

The device is operated or "cocked" by holding the float firmly in one hand and with the other hand gripping the knob 27 and pulling this downward such a distance that the two levers, 20 and 21, will form an acute angle, or be in a "cocked position," as in the latter the reduced portion 24 in the lever 20 engages the set off 14. A slight pull on the loop 19 will, in turn, set off the trigger mechanism by releasing the lever 20, which will then assume a position in elongation of the lever 21 within the tube 11.

It is obvious that changes may be made in the form, construction and arrangement of the several parts, as shown, within the scope of the appended claims, without departing from the spirit of the invention, and I do not, therefore, wish to limit myself, to the exact construction shown and described herein.

What I claim as new and desire to secure by Letters Patent of the United States is:

1. An automatic fishing device comprising a float having a vertical central opening therein, a longitudinal tube mounted in said opening, a spring surrounding said tube, a knob at the upper end of the tube and a set off within said opening, said spring abutting said knob and the set off with its upper and lower ends, respectively, said tube being formed with an oblong slot in the side thereof, two levers pivotally connected, one of said levers extending through said oblong slot when in a cocked position and having one end pivotally connected to the tube, said one lever being formed with a reduced portion adapted to engage one side of the lower edge of the float surrounding said vertical opening when said levers are in a cocked position, a second tube formed with a slot therein and being slidably mounted in the lower portion of said first tube, the second lever having one end pivotally connected to said second tube, and a pin for connecting said second lever to the latter, a thin wire having its upper end terminating in a loop and the other end connected to said pin, a second knob mounted at the end of the first tube, a second pin through said second knob and adapted to move in the slot of the second tube, a spring attached to said second pin and adapted to engage a ring with its lower end, whereby, when a pull is exerted upon said second knob, the two levers will snap into a cocked position.

2. An automatic fishing device comprising a float having a vertical opening therein, a longitudinal tube mounted in said opening, a spring wound around said tube, the latter being formed with an oblong slot therein, a lever extending through said slot when in a cocked position and being pivotally connected to said tube, a second tube having a slot therein near its bottom and being slidably mounted in the lower portion of said first tube, a second lever having one end pivotally connected to said first lever and the other end extending through said first slot when in a cocked position, a pin pivotally securing said second lever to said second tube, a wire terminating at one end in a loop and having the other end connected to said pin, a knob at the lower end of the first tube, a second pin through said knob and adapted to move in said slot in said second tube, and a spring attached to said second pin and made to engage a ring with its lower free end, whereby, when a pull is exerted upon said knob, the two levers will assume a knee-bend position.

References Cited in the file of this patent

UNITED STATES PATENTS

| | | |
|---|---|---|
| 2,712,194 | Di Stefano | July 5, 1955 |
| 2,726,470 | Bass et al. | Dec. 13, 1955 |
| 2,755,589 | Osborne | July 24, 1956 |